US012680987B2

(12) United States Patent
Fukushima

(10) Patent No.: US 12,680,987 B2
(45) Date of Patent: Jul. 14, 2026

(54) GAS CHROMATOGRAPH

(71) Applicant: SHIMADZU CORPORATION, Kyoto (JP)

(72) Inventor: Daiki Fukushima, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 259 days.

(21) Appl. No.: 18/739,355

(22) Filed: Jun. 11, 2024

(65) Prior Publication Data

US 2025/0020617 A1 Jan. 16, 2025

(30) Foreign Application Priority Data

Jul. 14, 2023 (JP) ................................. 2023-115876

(51) Int. Cl.
*G01N 30/32* (2006.01)
*G01N 30/12* (2006.01)
G01N 30/02 (2006.01)

(52) U.S. Cl.
CPC ............. *G01N 30/32* (2013.01); *G01N 30/12* (2013.01); *G01N 2030/025* (2013.01); *G01N 2030/126* (2013.01); *G01N 2030/324* (2013.01); *G01N 2030/328* (2013.01)

(58) Field of Classification Search
CPC .. G01N 30/32; G01N 30/12; G01N 2030/025; G01N 2030/126; G01N 2030/324; G01N 2030/328; G01N 30/06; G01N 30/68
USPC ........................................................ 73/23.35
See application file for complete search history.

(56) References Cited

U.S. PATENT DOCUMENTS

2019/0137457 A1* 5/2019 Koga ..................... G01N 30/32

FOREIGN PATENT DOCUMENTS

| JP | 2008-256714 A | | 10/2008 | |
| JP | 2016057148 A | * | 4/2016 | |
| WO | WO-2008026241 A1 | * | 3/2008 | ............. G01N 30/12 |
| WO | 2017/191673 A1 | | 11/2017 | |

OTHER PUBLICATIONS

Translation of JP-2016057148-A (Year: 2016).*
Translation of WO-2008026241-A1 (Year: 2008).*

* cited by examiner

*Primary Examiner* — Nathaniel T Woodward
(74) *Attorney, Agent, or Firm* — Muir Patent Law, PLLC

(57) ABSTRACT

In a sample vaporization chamber, a liquid sample is vaporized therein to produce a sample gas. A split flow path is configured to discharge the sample gas in the sample vaporization chamber. A valve is provided in the split flow path and opens/closes to adjust a flow rate of the sample gas flowing through the split flow path. A filler material is provided at a filling position in the sample vaporization chamber or in the split flow path. The controller is configured to control a degree of opening of the valve so that when the sample gas in the sample vaporization chamber is discharged from the split flow path, a pressure in the sample vaporization chamber decreases at a pressure gradient smaller than a pressure gradient at which the filler material is displaced from the filling position.

5 Claims, 6 Drawing Sheets

GAS CHROMATOGRAPH

CROSS-REFERENCE TO RELATED APPLICATIONS

This application claims priority under 35 U.S.C. § 119 to Japanese Patent Application No. 2023-115876 filed on Jul. 14, 2023, the entire disclosure of which is incorporated herein by reference in its entirety.

BACKGROUND OF THE INVENTION

Field of the Invention

The present disclosure relates to a gas chromatograph configured to vaporize a liquid sample in a sample vaporization chamber to produce a sample gas and discharge the sample gas from a split flow path.

Description of the Related Art

The following description sets forth the inventor's knowledge of the related art and problems therein and should not be construed as an admission of knowledge in the prior art.

A gas chromatograph is equipped with a sample vaporization chamber configured to vaporize a liquid sample therein to generate a sample gas, and a split flow path through which the sample gas in the sample vaporization chamber is discharged. The split flow path is equipped with a valve (split valve) configured to open and close to adjust the flow rate of the sample gas flowing through the split flow path.

In the gas chromatograph disclosed in Patent Document 1, a liner (insert) constituted by a glass tube is inserted into the sample vaporization chamber. The liner is filled with an adsorbent, etc., as a filler material, at a predetermined filling position.

In the gas chromatograph disclosed in Patent Document 2, a filter is provided in the split flow path. The filter is provided at a predetermined filling position in the split flow path. With the particulate filler material filled within the filter, components in the sample gas can be captured.

PRIOR ART DOCUMENT

Patent Document

Patent Document 1: Japanese Unexamined Patent Application Publication No. 2008-256714
Patent Document 2: International Publication No. WO 2017/191673

When the gas chromatograph is in operation, the pressure in the sample vaporization chamber is at a high level. When turning off the gas chromatograph, the sample gas in the sample vaporization chamber can be discharged through the split flow path by opening the split valve. At this time, when the split valve is fully opened, the pressure in the sample vaporization chamber decreases at a large pressure gradient.

When the pressure in the sample vaporization chamber decreases at a large pressure gradient, the filler material in the liner provided within the sample vaporization chamber may be displaced from its filling position. In this case, the liquid sample injected into the sample vaporization chamber may be unevenly thermally affected by the filler material, resulting in non-uniform vaporization, which may lead to poor reproducibility of the analysis.

Further, when the pressure in the sample vaporization chamber decreases at a large pressure gradient, the filler in the split flow path may be displaced from its filling position. In this case, the particulate filler materials filled in the filter may flow out of the filter through the split flow path. In cases where particles of the filler material flowing out of the filter become embedded in components in the split valve provided on the downstream side, the split valve may malfunction.

SUMMARY OF THE INVENTION

The present disclosure has been made in view of the above-mentioned circumstances, and it is an object to provide a gas chromatograph capable of preventing a filler material in a sample vaporization chamber or in a split flow path from shifting from its filling position.

A gas chromatograph according to one aspect of the present disclosure is equipped with a sample vaporization chamber, a split flow path, a valve, a filler material, and a controller. In the sample vaporization chamber, a liquid sample is vaporized therein to produce a sample gas. The split flow path is configured to discharge the sample gas in the sample vaporization chamber. The valve is provided in the split flow path and opens and closes to adjust a flow rate of the sample gas flowing in the split flow path. The filler material is provided at a filling position in at least one of the sample vaporization chamber and the split flow path. The controller is configured to control a degree of opening of the valve so that when the sample gas in the sample vaporization chamber is discharged from the split flow path, a pressure in the sample vaporization chamber decreases at a pressure gradient smaller than a pressure gradient at which the filler material is displaced from the filling position.

According to the present disclosure, it is possible to prevent the filler material in the sample vaporization chamber or in the split flow path from being displaced from its filling position.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present disclosure are shown by way of example, and not limitation, in the accompanying figures.

DETAILED DESCRIPTION OF THE PREFERRED EMBODIMENTS

In the following paragraphs, some preferred embodiments of the present disclosure will be described by way of example and not limitation. It should be understood based on this disclosure that various other modifications can be made by those in the art based on these illustrated embodiments.

1. Overall Configuration of Gas Chromatograph

Figure 1:
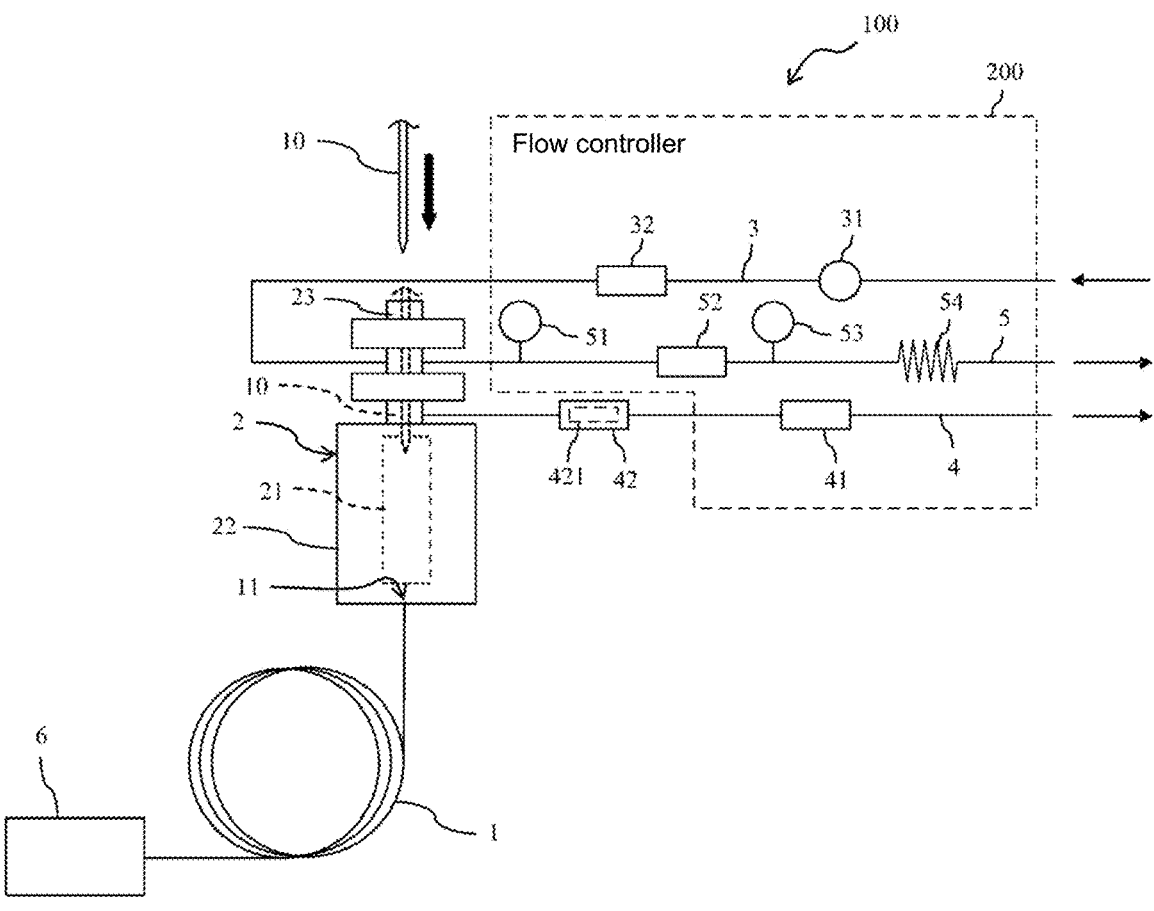
FIG. 1 is a schematic diagram showing a configuration example of a gas chromatograph according to one embodiment of the present invention.

FIG. 1 is a schematic diagram showing a configuration example of a gas chromatograph 100 according to one embodiment of the present disclosure. The gas chromatograph 100 is used for an analysis by supplying a sample gas along with a carrier gas into a column 1. In addition to the column 1, it is equipped with a sample introduction unit 2, a gas supply flow path 3, a split flow path 4, a purge flow path 5, and a detector 6.

The column 1 is constituted by, for example, a capillary column, which is heated in a column oven during analysis. One end of the column 1 is connected to the sample introduction unit 2, and a sample gas is introduced into the column 1 together with a carrier gas from the column inlet 11 from the sample introduction unit 2. The other end of the column 1 is connected to the detector 6. The detector 6 can be configured by various detectors, such as a hydrogen flame ionization detector (FID).

The interior of the sample introduction unit 2 is partitioned to define a sample vaporization chamber 21, which is a space for vaporizing a sample. Specifically, the sample introduction unit 2 is equipped with a hollow housing 22 and a septum 23 that seals the housing 22. The housing 22 has an opening, not shown, which is sealed by a flexible septum 23. A liquid sample is injected into the sample vaporization chamber 21, and the sample gas produced by the vaporization of the liquid sample in the sample vaporization chamber 21 is introduced into the column 1 from the column inlet 11 along with the carrier gas. The sample vaporization chamber 21 is in communication with the gas supply flow path 3, the split flow path 4, and the purge flow path 5.

The gas supply flow path 3 is a flow path for supplying a carrier gas into the sample vaporization chamber 21 of the sample introduction unit 2. The gas supply flow path 3 is equipped with, for example, a flow rate sensor 31 and a full flow valve 32. The flow sensor 31 detects the flow rate of the carrier gas in the gas supply flow path 3. The full flow valve 32 opens and closes the gas supply flow path 3, thereby enabling the adjustment of the flow rate of the carrier gas in the gas supply flow path 3 as desired, between an open state in which the carrier gas is supplied from the gas supply flow path 3 to the sample introduction unit 2 and the closed state in which the carrier gas supply is stopped.

The split flow path 4 is a gas flow path used for discharging a part of the gas (a mixture of a carrier gas and a sample gas) in the sample vaporization chamber 21 to the outside at a specified split ratio, when introducing the carrier gas and the sample gas into the column 1 from the column inlet 11 by a split introduction method. The split flow path 4 is equipped with, for example, a split valve 41 and a split filter 42.

The split valve 41 is opened and closed to adjust the flow rate of the sample gas flowing through the split flow path 4. Specifically, the split valve 41 opens and closes the split flow path 4, thereby enabling the arbitrary adjustment of the gas flow rate in the split flow path 4 between an open state in which a gas is discharged from the sample introduction unit 2 through the split flow path 4 and a closed state in which a gas discharge from the sample introduction unit 2 is stopped. The split filter 42 is provided at a predetermined filling position in the split flow path 4, and the particulate filler material 421 filled in the split filter 42 can collect the sample components in the sample gas. Since no fixture is provided to fix the filler material 421, when an external force is applied to the filler material 421, if the external force exceeds the frictional force, the filler material 421 may be displaced from its filling position.

In this example, the split filter 42 is located on the sample introduction unit 2 side of the split valve 41, and can collect components derived from the sample that may degrade the split valve 41. If the filler material 421 is displaced from its filling position and flows out of the split filter 42, components, such as a split valve 41 which is located on the downstream side of the split filter, may embed particles of the filler material 421, resulting in a malfunction.

The purge flow path 5 is a flow path for discharging undesired components generated from the septum 23 and other parts to the outside. The purge flow path 5 is equipped with, for example, an inlet pressure sensor 51, a purge valve 52, a purge pressure sensor 53, and a flow path resistance 54. The inlet pressure sensor 51 is installed upstream of the purge valve 52 (on the sample introduction unit 2 side) and detects the pressure of the gas in the sample vaporization chamber 21, i.e., the pressure (the inlet pressure) of the gas at the column inlet 11. The purge valve 52 opens and closes the purge flow path 5, thereby adjusting the gas flow rate in the purge flow path 5 as desired between the open state in which a gas is discharged from the sample introduction unit 2 through the purge flow path 5 and the closed state in which the discharge of the gas from the sample introduction unit 2 is stopped. The purge pressure sensor 53 detects the pressure in the purge flow path 5 on the downstream side of the purge valve 52. The flow resistance 54 is provided on the downstream side of the purge pressure sensor 53 to restrict the gas flow rate in the purge flow path 5 to a certain value.

The purge flow path 5 is less prone to pressure loss due to the characteristics of low and almost constant gas flow rates. Therefore, by installing the inlet pressure sensor 51 in the purge flow path 5, the inlet pressure can be detected more accurately. Note that the inlet pressure sensor 51 may be provided not only in the purge flow path 5 but also in any other part (e.g., the split flow path 4) that is connected to the column inlet 11.

The flow sensor 31, the full flow valve 32, the split valve 41, the inlet pressure sensor 51, the purge valve 52, the purge pressure sensor 53, and the flow path resistance 54 constitute the flow controller 200. The flow controller 200 is used to control the gas flow rate in the gas supply flow path 3, the split flow path 4, and the purge flow path 5, and includes a control unit 7 and a storage unit 8, which will be described below.

During the analysis using this gas chromatograph 100, the full flow valve 32 adjusts the open/close state of the gas supply flow path 3, the split valve 41 adjusts the open/close state of the split flow path 4, and the purge valve 52 adjusts the open/close state of the purge flow path 5. A carrier gas is supplied into the sample vaporization chamber 21 of the sample introduction unit 2 from the gas supply flow path 3 at a flow rate corresponding to the degree of opening of the full flow valve 32.

The liquid sample to be analyzed is injected into the sample vaporization chamber 21 by a syringe 10. At this time, the syringe 10 is inserted into the sample vaporization chamber 21 through the septum 23. In this state, a liquid sample is injected from the syringe 10 into the sample vaporization chamber 21, and a sample gas is generated by the vaporization of the liquid sample in the sample vaporization chamber 21. The generated sample gas is fed into the column 1 along with the carrier gas, and the components in the sample gas are separated in the process of passing through the column 1. The components in the separated sample gas are detected by the detector 6.

2. Specific Configuration of Sample Introduction Unit

Figure 2:
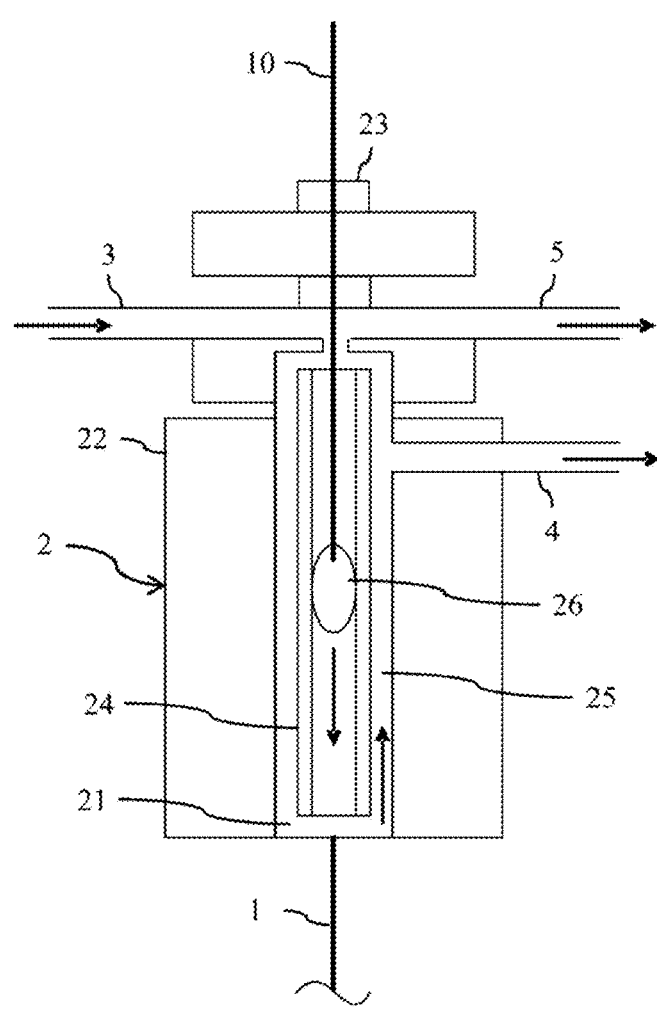
FIG. 2 is a schematic cross-sectional view showing a specific configuration of a sample introduction unit.

FIG. 2 is a schematic cross-sectional view showing the specific configuration of the sample introduction unit 2. The sample vaporization chamber 21 formed in the sample introduction unit 2 has a vertically elongated shape. A cylindrical glass insert 24 is inserted into the sample vaporization chamber 21.

The insert 24 is detachable from the inside of the sample vaporization chamber 21. In the state in which the insert 24 is inserted into the sample vaporization chamber 21, a space 25 is formed between the inner surface of the sample vaporization chamber 21 and the outer surface of the insert 24, and the space 25 serves as a gas flow path. In other words, the carrier gas supplied from the gas supply flow path 3 into the sample vaporization chamber 21 passes through the insert 24 from the upper end to the lower end, and then flows upward from the lower end of the insert 24 through the space 25 outside of the insert 24 and out to the split flow path 4.

At a predetermined filling position (e.g., in the center) within the insert 24, a filler material 26 made of an adsorbent is placed. The filler material 26 is made of a material with high adsorptive properties, such as wool. When a liquid sample is injected by the syringe 10, the tip of the syringe 10, inserted into the sample vaporization chamber 21, comes close to or contacts the filler material 26, and the liquid sample is injected from the tip of the syringe 10 into the filler material 26.

Since no fixture is provided to fix the filler material 26, when an external force is applied to the filler material 26, if the external force exceeds the frictional force, the filler material 26 may be displaced from its filling position. In cases where the tip of the syringe 10, which is inserted into the sample vaporization chamber 21 at the time of injecting a liquid sample, is not sufficiently close to or not in contact with the filler material 26 due to the filler material 26 being displaced from its filling position, the liquid sample may not vaporize uniformly, resulting in poor analysis reproducibility. Further, there are cases in which the sample vaporization chamber 21 is filled with a catalyst used for heatable detaching tubes or methanizers, as filler material. Even in such a configuration, there is a risk that the analysis reproducibility may be degraded due to the displacement of the filler material.

3. Electrical Configuration of Gas Chromatograph

Figure 3:
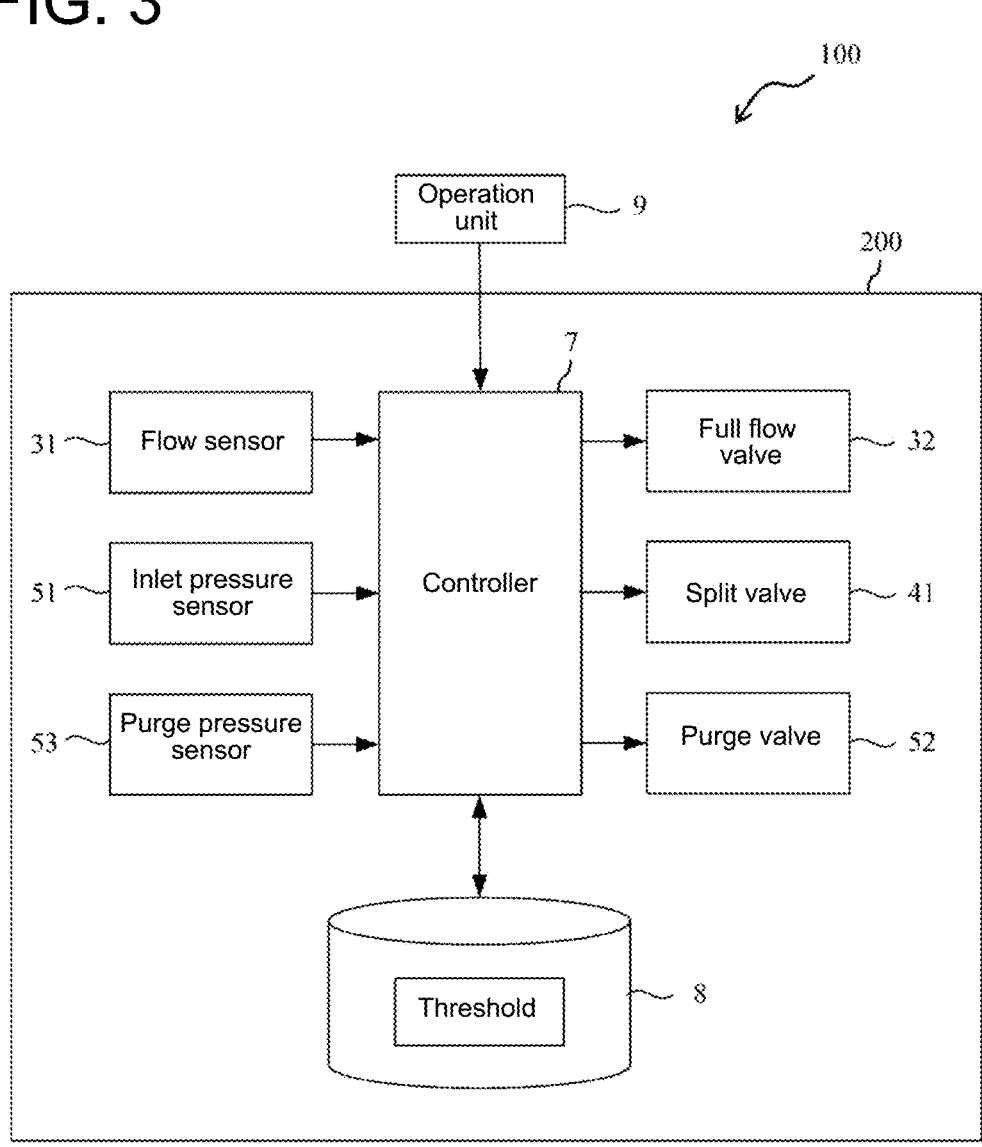
FIG. 3 is a block diagram showing an electrical configuration of the gas chromatograph.

FIG. 3 is a block diagram showing the electrical configuration of the gas chromatograph 100. The flow controller

200 is equipped with a controller 7 that includes, for example, a CPU (Central Processing Unit). The flow rate sensor 31, the full flow valve 32, the split valve 41, the inlet pressure sensor 51, the purge valve 52, the purge pressure sensor 53, and the storage unit 8, etc., are electrically connected to the controller 7. The storage unit 8 is equipped with a RAM (Random Access Memory) or a ROM (Read Only Memory).

The controller 7 controls the degrees of opening of the full flow valve 32, the split valve 41, and the purge valve 52, based on the input signals from the flow rate sensor 31, the inlet pressure sensor 51, and the purge pressure sensor 53. At this time, the controller 7 compares the input signals from the flow rate sensor 31, the inlet pressure sensor 51, and the purge pressure sensor 53 with the thresholds stored in the storage unit 8 as necessary, and controls the degrees of opening of the full flow valve 32, the split valve 41, and the purge valve 52, based on the results of this comparison.

An operation unit 9 is electrically connected to the controller 7. The operation unit 9 is configured to include a keyboard and/or a mouse, thereby allowing the user or other operator to perform input operations by using the operation unit 9. For example, the above-described thresholds may be stored in the storage unit 8 by the operator using the operating unit 9.

4. Control of Split Valve

Figure 4:
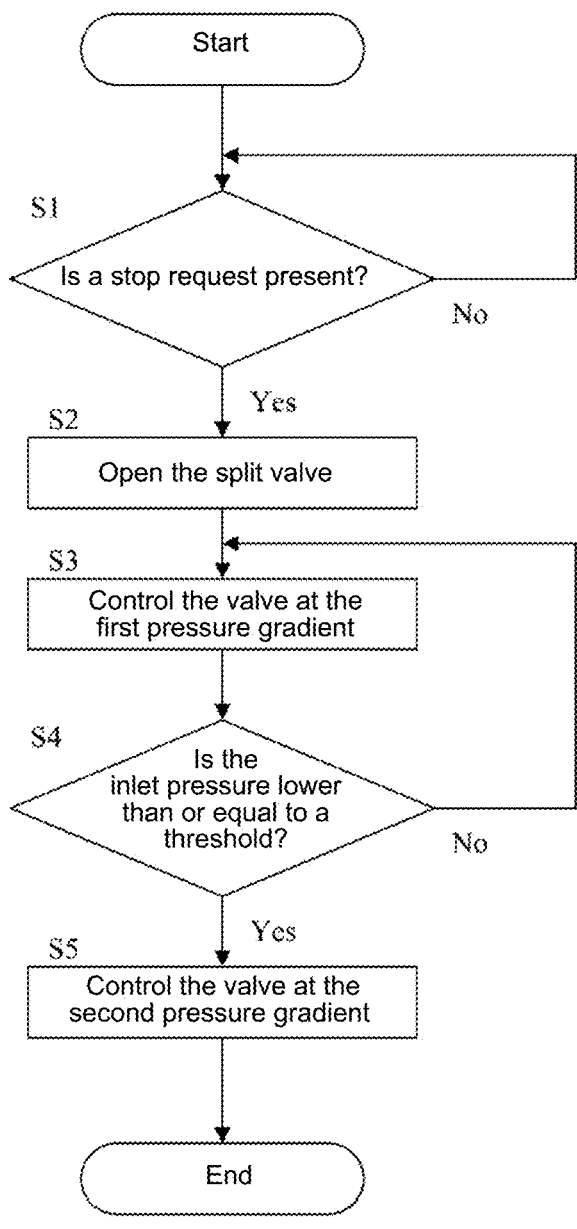
FIG. 4 is a flowchart showing one example of the processing by a controller when controlling a split valve.

FIG. 4 is a flowchart showing one example of the processing by a controller 41 when controlling a split valve 41. Hereinafter, the control of the degree of opening of the split valve 41 by the controller 7 when the operation of the gas chromatograph 100 is stopped will be described.

For example, at the time of shutting down the gas chromatograph 100, at the time of an abnormality occurrence in the gas chromatograph 100, or at the time of equipment self-diagnosis of the gas chromatograph 100, a command to stop the operation of the flow controller 200 is generated. Such a command may be generated based on the operation of the operation unit 9 or may be generated automatically based on input signals from various sensors.

The "at the time of shutting down" refers to when the gas chromatograph 100 is stopped, including at the time of shutting down by turning off the power of the gas chromatograph 100. Further, "at the time of an abnormality occurrence" refers to not only the time of an abnormality occurring inside the gas chromatograph 100, but also at the time of an abnormality occurring in other devices (e.g., pretreatment devices) connected to the gas chromatograph 100. The term "abnormality" refers to a concept that includes any failures of the equipment, such as gas leaks, detection failures, and high temperature conditions. The term "equipment self-diagnosis" refers to the process of diagnosing the operational status (including abnormal conditions) of the gas chromatograph 100 or any other equipment connected to the gas chromatograph 100.

When stopping the operation of the flow controller 200, the inside of the sample vaporization chamber 21 is pressurized by the inflow of the carrier gas, resulting in a high-pressure state. If there is a request to stop the operation of the flow controller 200 (Yes in Step S1), the controller 7 opens the split valve 41 (Step S2) to discharge the sample gas in the sample vaporization chamber 21 through the split flow path 4.

At this time, the controller 7 regulates the degree of opening of the split valve 41 so that the pressure in the sample vaporization chamber 21 decreases at a first pressure gradient (Step S3). The first pressure gradient refers to a pressure gradient that is less than the pressure gradient that causes the filler material provided in the gas chromatograph 100 to be displaced from its position when the sample gas in the sample vaporization chamber 21 is discharged from the split flow path 4. The amount of displacement of the filler material from the filling position may be allowed as long as the amount of displacement is within the range that does not affect the analysis results (e.g., analysis reproducibility) or cause failure of the components (e.g., the split valve 41). In other words, the first pressure gradient may be set within the range of the aforementioned displacement. The term "gradient" in the present disclosure refers to both linear and non-linear (curvilinear) gradients.

The above-described filler material includes a filler material that is filled at a filling position in the sample vaporization chamber 21, such as the filler material 26, or a filler material that is filled at a filling position in the split flow path 4, such as the filler material 421. The filler material is provided at a filling position in the sample vaporization chamber 21 or in the split flow path 4, and the filling position of the filler material is not limited to the specific locations of each filler material 26, 421.

The pressure control by the controller 7 at the first pressure gradient is continued until, for example, the pressure in the sample vaporization chamber 21, as detected by the inlet pressure sensor 51, falls below or equal to a threshold. The above-described threshold is a pressure greater than atmospheric pressure, and is the pressure at which the filler material is not be displaced (moved) from the filling position even if the degree of opening of the split valve 41 is subsequently increased (e.g., fully opened).

The above-described threshold can be preset in the storage unit 8 by the operator operating the operation unit 9. For example, the operator may perform tasks to determine the threshold and then store the appropriate threshold in the storage unit 8. Specifically, by switching the split valve 41 to the fully opened state at different times a plurality of times, the pressure at which the filler material is displaced from the filling position when the split valve 41 is fully opened may be identified, and the pressure equal to or slightly higher than the pressure may be stored in the storage unit 8 as the threshold.

The first pressure gradient (dp/dt) can be calculated, for example, by the following Formula (1).

$$Dp/dt = F \times Ps/V \qquad (1)$$

"F" is the restricted flow rate, "Ps" is the standard atmospheric pressure (101.325 kPa), and "V" is the volume of the control system. The restricted flow rate is a flow rate at which the filler material is not displace from the filling position, e.g., 500 to 700 ml/min, more specifically, about 600 ml/min, but set appropriately according to the type of the filler material and the filling position. As described above, the first pressure gradient can be calculated based on the restricted flow rate, but the formula for calculating the first pressure gradient is not limited to Formula (1).

When the pressure control (Yes in Step S3) at the first pressure gradient is maintained, and therefore, the pressure in the sample vaporization chamber 21 detected by the inlet pressure sensor 51 becomes less than or equal to the threshold (Yes in Step S4), the control unit 7 controls the degree of opening of the split valve 41 so that the pressure in the sample vaporization chamber 21 decreases at a second pressure gradient greater than or equal to the first pressure gradient (Step S5). The second pressure gradient is, for example, a pressure gradient when the degree of opening of the split valve 41 is controlled (when fully opened) so that the flow resistance of the split valve 41 is minimized. However, the second pressure gradient is preferably the pressure gradient when the split valve 41 is fully opened, but it is not limited to the fully open as long as the flow resistance of the split valve 41 can be minimized.

The pressure control at the second pressure gradient by the controller 7 is performed at least until the pressure in the sample vaporization chamber 21, as detected by the inlet pressure sensor 51, reaches the atmospheric pressure. The pressure control at the second pressure gradient may be terminated based on the input signal from the inlet pressure sensor 51, or after the elapse of a certain period of time sufficient for the pressure in the sample vaporization chamber 21 to reach atmospheric pressure.

5. Comparison of Pressure Changes in Sample Vaporization Chamber

Figure 5A:
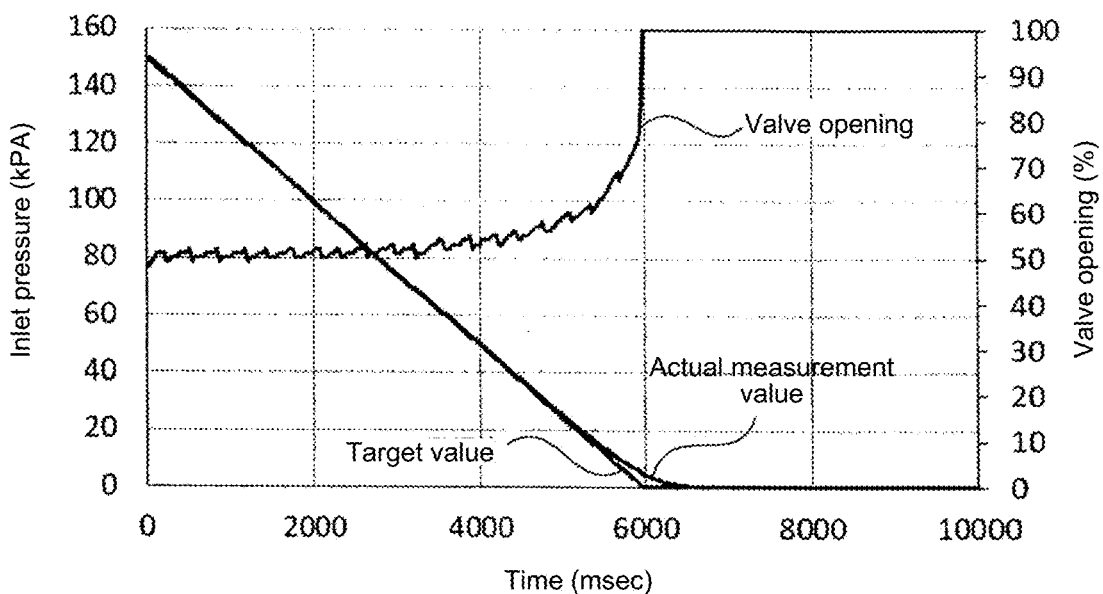
FIG. 5A is a diagram showing one example of pressure changes when the target value of the pressure control in the sample vaporization chamber by the controller is maintained at a constant gradient.
Figure 5B:
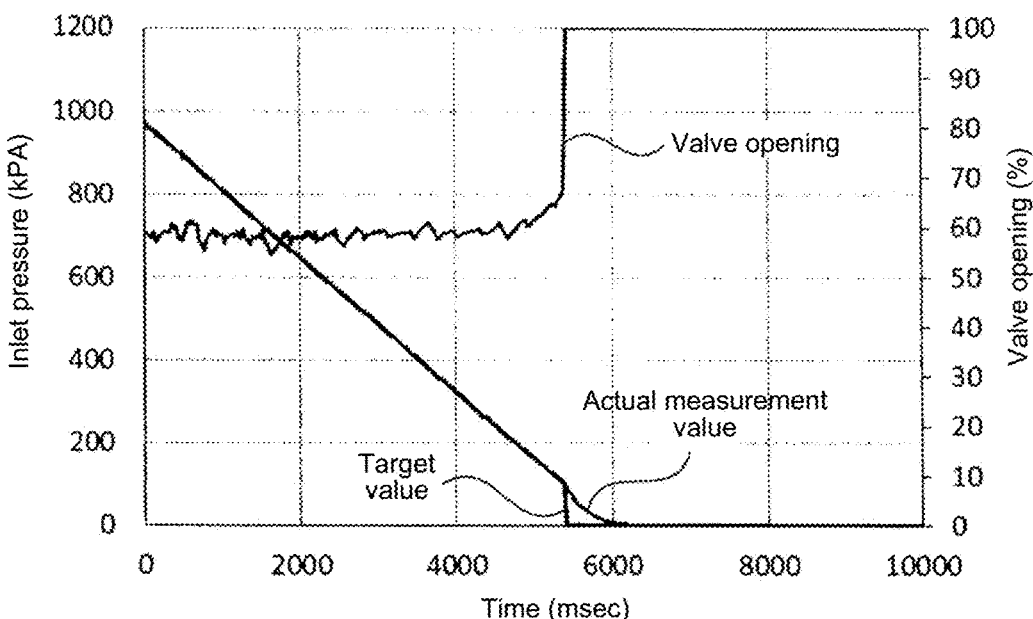
FIG. 5B is a diagram showing one example of pressure changes when the gradient of the target value of the pressure control in the sample vaporization chamber by the controller is changed midway.

FIG. 5A is a diagram showing one example of pressure changes when the target value of the pressure control in the sample vaporization chamber 21 by the controller 7 is maintained at a constant gradient. FIG. 5B is a diagram showing one example of pressure changes when the gradient of the target value of the pressure control in the sample vaporization chamber 21 by the controller 7 is switched midway.

The example in FIG. 5A shows a case in which the target value of the inlet pressure is set to decrease at a constant gradient, and the controller 7 controls the degree of opening of the split valve 41. As shown in FIG. 5A, when the target value of the inlet pressure is set to decrease at a constant gradient, the pressure gradient of the inlet pressure detected by the inlet pressure sensor 51 remains a linear constant value until the inlet pressure falls to or below a predetermined value. However, when the inlet pressure drops to or below a predetermined value, a discrepancy occurs between the target value of the inlet pressure and the inlet pressure (as measured) detected by the inlet pressure sensor 51 due to the flow path resistance of the components, such as the split valve 41 and the split filter 42.

In contrast, when the pressure control of the inlet pressure is switched from the first pressure gradient to the second pressure gradient, as shown in FIG. 5B, the gradient of the inlet pressure target value is switched before the inlet pressure drops to a predetermined value at which the target and actual measured values of the inlet pressure diverge. As a result, the pressure gradient of the inlet pressure detected by the inlet pressure sensor 51 remains a linear constant value (the first pressure gradient) until the target value gradient of the inlet pressure is switched.

Thereafter, the target value of the inlet pressure is switched to the atmospheric pressure. In this case, instead of controlling the degree of opening of the split valve 41 based on the inlet pressure detected by the inlet pressure sensor 51, it may be appropriate to control the split valve 41 to be fully opened. Thus, by switching the pressure control of the inlet pressure to the second pressure gradient, which is greater than the first pressure gradient, the gas in the sample vaporization chamber 21 can be discharged more quickly.

6. Modifications

The pressure control at the first pressure gradient by the controller 7 is not limited to the configuration in which the pressure in the sample vaporization chamber 21, as detected by the inlet pressure sensor 51, for example, is maintained until the pressure in the sample vaporization chamber 21 falls to or below a threshold, but may also be maintained for a fixed time, for example. In this case, the above-described fixed time may be set arbitrarily by the operator or calculated by the controller 7 based on the history of past input signals from sensors (such as, e.g., the inlet pressure sensor 51).

Further, it may be configured such that the pressure control at the second pressure gradient by the controller 7 is omitted, and only the pressure control at the first pressure gradient is performed. In other words, the pressure control by the controller 7 at the first pressure gradient may be maintained until the pressure in the sample vaporization chamber 21, as detected by the inlet pressure sensor 51, reaches the atmospheric pressure.

7. Aspects

It would be understood by those skilled in the art that the exemplary embodiments described above are specific examples of the following aspects.

[Item 1]

A gas chromatograph according to one aspect of the present disclosure comprising;
a sample vaporization chamber configured to vaporize a liquid sample to produce a sample gas;
a split flow path configured to discharge the sample gas in the sample vaporization chamber;
a valve provided in the split flow path, the valve being configured to open and close to adjust a flow rate of the sample gas flowing in the split flow path;
a filler material provided at a filling position in at least one of the sample vaporization chamber and the split flow path; and
a controller configured to control a degree of opening of the valve so that when the sample gas in the sample vaporization chamber is discharged from the split flow path, a pressure in the sample vaporization chamber decreases at a pressure gradient smaller than a pressure gradient at which the filler material is displaced from the filling position.

According to the gas chromatograph described in the above-described Item 1, when discharging the sample gas in the sample vaporization chamber from the split flow path, by controlling the degree of opening of the valve, it is possible to prevent the filler material in the sample vaporization chamber or in the split flow path from being displaced from its filling position.

[Item 2]

In the gas chromatograph as recited in the above-desried Item 1, it may be configured such that
the gas chromatograph as recited in claim 1, further comprises a pressure sensor configured to detect the pressure in the sample vaporization chamber,
wherein the controller is configured to control the degree of opening of the valve so that the pressure in the sample vaporization chamber decreases at a first pressure gradient that is smaller than the pressure gradient at which the filler material is displaced from the filling position until the pressure in the sample vaporization chamber detected by the pressure sensor becomes less than or equal to a threshold, and then control the degree of opening of the valve so that the pressure in the sample vaporization chamber decreases at a second pressure gradient that is larger than the first pressure gradient.

According to the gas chromatograph as recited in the above-described Item 2, by performing pressure control at the first pressure gradient until the pressure in the sample vaporization chamber detected by the pressure sensor becomes less than or equal to the threshold value, it is possible to prevent the filler material in the sample vaporization chamber or in the split flow path from being displaced from its filling position. Thereafter, by performing the pressure control at the second pressure gradient that is greater than the first pressure gradient, it is possible to expedite the discharge of the sample gas in the sample vaporization chamber.

[Item 3]

In the gas chromatograph as recited in the above-described Item 2, it may be configured such that the second pressure gradient is a pressure gradient that occurs when the degree of opening of the valve is controlled so that a flow resistance of the valve is minimized.

According to the gas chromatograph as recited in the above-described Item 3, after switching the pressure control in the sample vaporization chamber from the first pressure gradient to the second pressure gradient, the gas in the sample vaporization chamber can be discharged as quickly as possible.

[Item 4]

In the gas chromatograph as recited in the above-described Item 1, it may be configured such that
the filler material is filled at a filling position in an insert provided in the sample vaporization chamber.

According to the gas chromatograph as recited in the above-described Item 4, the filler material in the insert in the sample vaporization chamber can be prevented from being displaced from its filling position.

[Item 5]

In the gas chromatograph as recited in the above-described Item 1, it may be configured such that
the gas chromatograph as recited in claim 1, further comprises:
a filter provided at the filling position in the split flow path,
wherein the filler material is filled into the filter According to the fifth gas chromatograph as recited in the above-described Item 5, the filler material in the filter in the split flow path can be prevented from being displaced from its filling position.

While illustrative embodiments of the present disclosure have been described herein, the present disclosure is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive.

The invention claimed is:
1. A gas chromatograph comprising:
a sample vaporization chamber configured to vaporize a liquid sample to produce a sample gas;
a split flow path configured to discharge the sample gas in the sample vaporization chamber;
a valve provided in the split flow path, the valve being configured to open and close to adjust a flow rate of the sample gas flowing in the split flow path;

a filler material provided at a filling position in at least one of the sample vaporization chamber and the split flow path; and a controller configured to control a degree of opening of the valve so that when the sample gas in the sample vaporization chamber is discharged from the split flow path, a pressure in the sample vaporization chamber decreases at a pressure gradient smaller than a pressure gradient at which the filler material is displaced from the filling position.

2. The gas chromatograph as recited in claim 1, further comprising:

a pressure sensor configured to detect the pressure in the sample vaporization chamber, wherein the controller is configured to control the degree of opening of the valve so that the pressure in the sample vaporization chamber decreases at a first pressure gradient that is smaller than the pressure gradient at which the filler material is displaced from the filling position until the pressure in the sample vaporization chamber detected by the pressure sensor becomes less than or equal to a threshold, and then control the degree of opening of the valve so that the pressure in the sample vaporization chamber decreases at a second pressure gradient that is larger than the first pressure gradient.

3. The gas chromatograph as recited in claim 2, wherein the second pressure gradient is a pressure gradient that occurs when the degree of opening of the valve is controlled so that a flow resistance of the valve is minimized.

4. The gas chromatograph as recited in claim 1, wherein the filler material is filled at a filling position in an insert provided in the sample vaporization chamber.

5. The gas chromatograph as recited in claim 1, further comprising:

a filter provided at the filling position in the split flow path, wherein the filler material is filled into the filter.

\* \* \* \* \*